United States Patent
Valstar

[11] Patent Number: 5,878,527
[45] Date of Patent: Mar. 9, 1999

[54] INSTALLATION FOR CULTIVATION OF PLANTS ON A CONVEYOR BELT

[75] Inventor: Jacob Valstar, Honselersdijk, Netherlands

[73] Assignee: Damsigt B.V., Roosendaal, Netherlands

[21] Appl. No.: 684,061

[22] Filed: Jul. 19, 1996

Related U.S. Application Data

[62] Division of Ser. No. 392,343, Feb. 22, 1995, Pat. No. 5,561,943.

[30]     Foreign Application Priority Data

Feb. 22, 1994 [NL]  Netherlands ............................ 9400284
Jun. 21, 1994 [EP]  European Pat. Off. .............. 94201771

[51] Int. Cl.⁶ .................................................. A01G 9/00
[52] U.S. Cl. ..................... 47/1.01; 47/62; 47/65
[58] Field of Search ................................... 47/59, 65, 64, 47/62, 1.01, 901

[56]                References Cited

U.S. PATENT DOCUMENTS

| | | |
|---|---|---|
| 4,028,847 | 6/1977 | Davis et al. . |
| 4,166,341 | 9/1979 | Vestergaard . |
| 4,379,375 | 4/1983 | Eisenberg et al. . |
| 5,218,783 | 6/1993 | Langezaal et al. . |

FOREIGN PATENT DOCUMENTS

| | | |
|---|---|---|
| 0 061 244 | 9/1982 | European Pat. Off. . |
| 0 061 841 | 10/1982 | European Pat. Off. . |
| 2 659 192 | 9/1991 | France . |
| 2 702 927 | 9/1994 | France . |
| 1 245 581 | 9/1971 | United Kingdom . |
| 2 050 788 | 1/1981 | United Kingdom . |

*Primary Examiner*—Thomas Price
*Assistant Examiner*—Joanne C. Downs
*Attorney, Agent, or Firm*—Young & Thompson

[57]                ABSTRACT

The invention relates to a method for the cultivation of plants, comprising the following steps:

a) placing root containers (2) containing a plant on a cultivation conveyor belt (4), b) allowing the plants (3) cultivated in the root containers to grow on said cultivation conveyor belt whilst the cultivation conveyor belt is stationary, c) using the cultivation conveyor belt to transport the root containers placed on the cultivation conveyor belt to a dispensing point (14), for example when the plants have grown sufficiently or have to be given an intermediate treatment.

With this method it is advantageous if the cultivation conveyor belt (4) extends through a tray (1) having raised side walls (5) so that water can be supplied to the tray during step b) without said water flowing away of its own accord. The invention also relates to an installation for application of the method.

6 Claims, 1 Drawing Sheet

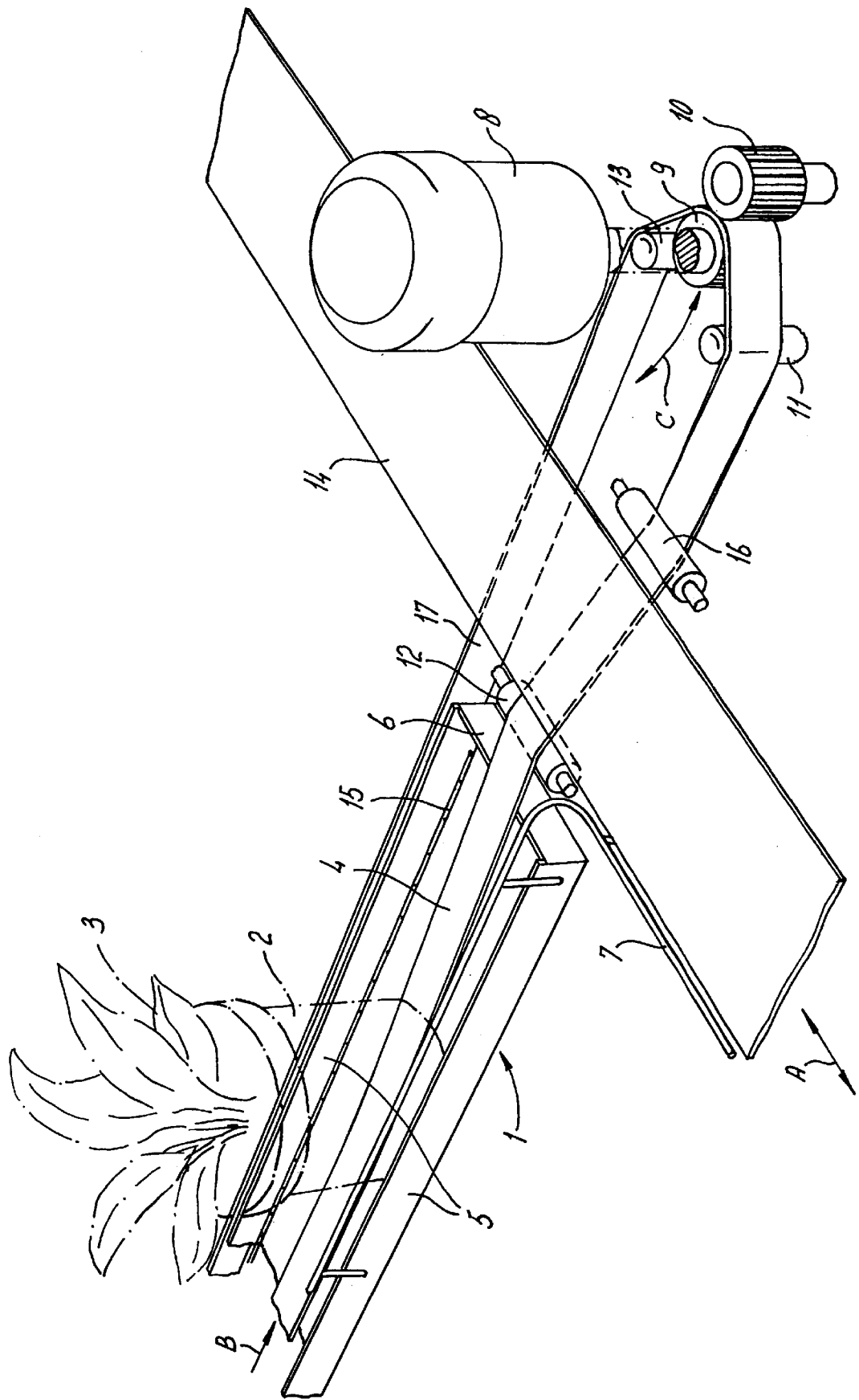

INSTALLATION FOR CULTIVATION OF PLANTS ON A CONVEYOR BELT

This application is a division of application Ser. No. 08/392,343, filed Feb. 22, 1995, now U.S. Pat. No. 5,561,943.

The present invention relates to a method for the cultivation of plants, in particular for the cultivation of plants in greenhouses.

The cultivation of plants in greenhouses is generally known. With this procedure the plants are frequently grown in root containers, such as pots filled with compost, substrate, etc. With this known procedure, the root containers containing plants are placed alongside one another on the nursery floor in a greenhouse. When the plants have grown sufficiently, the root containers containing plants are lifted one by one, or in grouped units, by hand or with the aid of manually operated devices and placed on a trolley for removal. The plants can then be subjected to a more detailed selection, for example on the basis of colour, and dispatched, for example to an auction.

Said removal of the cultivated plants from the nursery floor by hand is highly labour-intensive. Moreover, the nursery floors concerned often cover a very large area and staff therefore have to walk back and forth a fairly appreciable number of times.

Over the years attempts have been made to automate cultivation processes of this type. Thus, for example, a system is known with which the root containers containing plants are placed on large sheets and said sheets can be moved with the aid of a roller conveyor. When the plants are fully grown the sheets are then moved one by one to the side of the roller conveyor and are then placed on a trolley for removal. This solution also is still fairly labour-intensive and, moreover, roller conveyors and transport systems of this type are very expensive.

U.S. Pat. No. 4,166,341 discloses a complex method and apparatus for the cultivation of plants. The apparatus comprises a plurality of U-shaped channels extending parallel. The channels are open at the outer ends and each channel comprises a slidable supporting member extending through the gutter and supported at a distance above the bottom thereof by guides. The supporting member can be used for bringing plant beds in or out the channel. As the supporting member forms a liquid reservoir and carries plant beds, stiffening of the supporting member in the transverse direction of the channel is required, which makes the supporting member relatively complex and expensive. Further the supporting member is susceptible for leaving the tracks formed by the guides. Between the different growth stages the plant beds with plants are transferred from one channel to another channel or the transverse distance between neighbouring channels is enlarged. How the tranfer of beds with plants between the channels is accomplished is not clear, it seems to be done manually. As said, the apparatus disclosed in U.S. Pat. No. 4,166,341 is complex and the method disclosed in U.S. Pat. No. 4,166,341 labour-intensive.

EP-0,061,244 discloses a hollow trough having substantially closed sidewalls and a bottom. On a distance above the bottom extends an elongated flexible strip, which is slideably disposed in guides on the sidewalls of the trough. The strip contains a plurality of spaced apertures, in which plant pots are to be inserted. The underside of plant pots inserted in the apertures of the strip lies at a distance above the bottom of the trough. The plant pots are manually placed into the apertures by personel. The flexible strip is susceptible for breakage as a result of the apertures, and further the flexible strip is susceptible for leaving the tracks formed by the guides on the sidewalls of the trough. How the plant pots can be discharged out of the trough is not disclosed in EP-0,061,244, but this seems to be disclosed in EP-0,061,841 of the same applicant.

EP-A-0,061,841 discloses a complex device for discharging plant pots out of a trough like the trough disclosed in EP-A-0,061,244. The flexible strip is coupled to an elongating member, which pulls the flexible strip to wind it on a drum. The flexible strip is guided from the trough to the drum along a descending slope, which slope ends at a cylinder, which lifts the plant pots out of the apertures. The plant pots lifted out of the apertures in the flexible strip are placed on a working table for further manipulation. The coupling of the flexible strip to the discharging device is not described but seems complex to accomplish in an automatic manner. If accomplished manually, the discharging device should be accessible for personel. The discharge device according to EP-0,061,841 is unsuitable and unusable for placing plant pots in the apertures of the flexible strip extending in the trough.

The aim of the present invention is to automate the cultivation of plants, in particular the removal of the cultivated plants from the place of cultivation. In this context, a further aim of the invention is to provide a method which can be implemented using inexpensive means, so that the cost per square metre is low.

This aim is achieved according to the invention by means of a method for the cultivation of plants, comprising the following steps:

a) placing root containers containing a plant on a cultivation conveyor belt, b) allowing the plants cultivated in the root containers to grow on said cultivation conveyor belt whilst the cultivation conveyor belt is stationary, c) using the cultivation conveyor belt to transport the root containers placed on the cultivation conveyor belt to a dispensing point, for example when the plants have grown sufficiently or have to be given an intermediate treatment.

By installing a conveyor belt on the nursery floor and placing the root containers containing plants thereon, the root containers containing plants can be removed automatically to a dispensing point, whenever this is desired, by setting the conveyor belt in motion. This can, for example, be the case when the plants have grown sufficiently. However, there are many other conceivable reasons why it can be desirable temporarily to remove the root containers containing plants from the place of cultivation, for example when the plants have to be inspected for, or treated for, diseases. Conveyor belts of this type can be produced very inexpensively. Using relatively simple means, a web of material can be laid over, and also driven over, the nursery floor of a greenhouse in order to move the goods placed thereon off to one side. For example, it is conceivable as it were to cover the entire nursery floor with a single conveyor belt. However, it is also very readily conceivable to install a multiplicity of strip-like conveyor belts over a single nursery floor and on each strip-like conveyor belt to place a single row of root containers containing plants to be grown. The cultivation conveyor belt according to the invention can comprise a continuous conveyor belt, but can equally well be a conveyor belt extending between two winding drums, in which case the transporting effect is obtained by winding the conveyor belt alternately between the one and the other winding drum.

According to the invention it is particularly advantageous when the cultivation conveyor belt extends with that section carrying the root containers essentially in a tray delimited by raised walls, water, preferably a predetermined amount of water, being allowed to run into the tray from time to time during step b). As a consequence of the raised walls of the tray, water is prevented from flowing away and the entire amount of water supplied to the tray can be taken up by the root containers and plants. Wastage of water is thus completely prevented. As is customary in the cultivation of plants, feed supplements and pesticides to prevent diseases are preferably added to said water. This water containing feed supplements and pesticides constitutes an environmental pollutant and waste water therefore has to be treated. Because waste water can be completely avoided, there is therefore no pollution of the environment and it is even possible to dispense with treatment installations. Water will be allowed to run into the tray from time to time, as required, but in practice it will be possible to do this at set times, and often even periodically as the climate in a greenhouse can readily be adjusted and controlled.

In accordance with a further aim of the invention, if the dispensing point comprises a further conveyor belt, referred to as the main conveyor belt, the method according to the invention can be further automated by using the main conveyor belt during step a) to transport the root containers containing plants to the cultivation conveyor belt and to transfer them to the latter. Numerous transfer mechanisms known per se from the prior art, such as guides, can be used to effect said transfer. Thus, this further conveyor belt performs in this case a double function.

According to an advantageous embodiment, in the method according to the invention the cultivation conveyor belt is placed under tension only before it is set in motion for transport purposes during step a) or step c). This extends the life of a cultivation conveyor belt because the cultivation conveyor belt is under tension only when it has to fulfill its transporting role. A second advantage is that, in the case of a cultivation conveyor belt lying within a tray, the root containers containing plants can easily be lifted over the edge of a tray after the cultivation conveyor belt has been placed under tension, whilst during cultivation of the plants the weight of the root containers causes them to stand completely on the floor of the tray, so that they can readily take up water.

According to the invention it is also advantageous if, during transport using the cultivation conveyor belt, the root containers are fed between guide means extending on either side of, and parallel to, the cultivation conveyor belt. This prevents root containers being able to fall off the conveyor belt during transport, so that it is guaranteed that all root containers containing plants can be removed from the nursery floor.

The method according to the invention can, in particular, be employed very advantageously if the tray is a gutter and if the guide means comprise the longitudinal walls of the gutter. By using a multiplicity of gutters, each having one conveyor belt located therein, and placing a single row of root containers on said conveyor belt, very good adjustment and control of the water balance during the cultivation process can be achieved.

The invention also relates to an installation for application of the method according to the invention.

The invention, specific embodiments and an illustrative embodiment will now be explained in more detail with reference to a drawing.

Said drawing shows a perspective view of part of an installation for carrying out the method according to the invention.

The FIGURE shows a gutter 1 which is to be installed on a nursery floor and in which the transport section of a cultivation conveyor belt 4 is installed. The gutter 1 is provided all round with raised walls 5, 6. The gutter 1 terminates at one end at a main conveyor belt 14, which extends transversely to the longitudinal direction of the gutter.

As can be seen from the FIGURE the cultivation conveyor belt 4 is guided by means of guides 12 and 16 in such a way that said belt 4 passes beneath the main conveyor belt 14 and closely abuts the latter at guide 12, so that goods can be transferred from the one conveyor belt to the other conveyor belt.

The cultivation conveyor belt 4 shown in the FIGURE is of the continuous type and is tilted 90° between guide 16 and guide 11, so that the cultivation conveyor belt 4 has a vertical orientation. The cultivation conveyor belt 4 is then fed round guide 11 and guide 13, which is located some distance away from the latter, and returned alongside the gutter to the other end of the gutter. The return section 17 of the cultivation conveyor belt 4 will have a vertical orientation to a greater or lesser degree depending on the pretensioning of the cultivation conveyor belt 4.

A drive unit, which has a drive motor, is indicated by 8, the drive motor driving a toothed wheel 9. The toothed wheel 9 can be positioned between the guides 13 and 11 by means of a tilting movement in the direction of arrow C, or a translational movement optionally in combination with a tilting movement, the cultivation conveyor belt 4 being pretensioned by moving the entire drive unit 8 in the direction of pressure roller 10. This will cause the cultivation conveyor belt 4 to be clamped between drive wheel 9 and pressure roller 10, so that effective driving of the cultivation conveyor belt 4 is possible.

As is also shown in the figure, root containers, such as pots 2, in which a plant 3 is growing can be placed on the cultivation conveyor belt 4 in the gutter.

The cultivation process according to the invention is as follows:

Root containers 2 are supplied with the aid of the main conveyor belt 14, which is movable in two directions as shown by arrow A. By means of a guide, which extends over the main conveyor belt 14 and is not shown, the root containers 2 are guided onto the cultivation conveyor belt 4, which is movable in two directions as shown by arrow B. During this operation, the mutual spacing between root containers 2 guided onto the cultivation conveyor belt 4 can be adjusted as a function of the speed of the cultivation conveyor belt 4, the speed of the main conveyor belt 14 and the spacing with which the root containers 2 have been placed apart on the main conveyor belt 14.

When the gutter 1 has been completely filled in this way with root containers 2 placed sufficiently far apart, the cultivation conveyor belt 4, and optionally also the main conveyor belt 14, are stopped. The drive unit 8 can then be disconnected from the cultivation conveyor belt 4, the pretensioning on the cultivation conveyor belt 4 then also being removed, so that the cultivation conveyor belt 4 guided up over the front end wall 6 of the gutter 1 comes into contact over its entire length with the bottom of the gutter 1 under the weight of the root containers 2.

A preferably predetermined amount of water can be fed into the gutter by means of a pipe 15 provided with discharge openings. A uniform supply of water over the entire gutter can be effected by means of a suitable distribution of the discharge openings over the pipe 15.

When all of the water has been drawn up by the root containers and/or the plant, a fresh amount of water can be supplied, if necessary. It will be clear that with this arrangement no water is wasted.

When the plant 3 has grown sufficiently, the cultivation conveyor belt 4 can again be placed under tension and driven by means of the drive unit 8. The drive will now be in the opposite direction. In this way the root containers 2, containing the plant 3 which has grown sufficiently, are removed onto the main conveyor belt 14, after which the further transport of the root containers 2 can be undertaken by the main conveyor belt 14.

Since when the cultivation conveyor belt 4 is placed under tension it comes a little away from the bottom of the gutter at the end of the gutter, it is advantageous according to the invention if additional guides 7 are provided on either side of the end of the gutter. (Of these guides, only the guide 7 on one side is shown.) For the remainder of the path, the raised longitudinal side walls 5 act as a guide for the root containers 2 during transport through the gutter 1. With this arrangement the distance between the raised side walls 5 will be chosen to be preferably somewhat larger than the diameter of the pots 2.

Numerous variants of the method and installation according to the invention are conceivable, for example:

a brush can be fixed to the cultivation conveyor belt 4 so that during transport of the root containers 2 the gutter 1 is brushed clean at the same time;

a multiplicity of gutters 1 positioned parallel to one another can be used, each with one cultivation conveyor belt 4, with which arrangement heating pipes can then be installed between adjacent gutters. Such an installation of heating pipes is advantageous and also does not adversely effect the light available for growing the plant;

the drive unit 8 can be movable on a rail along the main conveyor belt and can be used for alternately driving a multiplicity of cultivation conveyor belts 4;

the nursery floor can also comprise a large trough having a multiplicity of parallel cultivation conveyor belts therein, in which case raised longitudinal guides then have to be fitted between the cultivation conveyor belts to replace the longitudinal side walls 5 of the gutter;

the belt guides 16, 11, 13 can comprise rollers, but can also be smooth, stationary guide elements. The belt guides can also comprise a slot enclosing the conveyor belt so that the cultivation conveyor belt is held in place.

I claim:

1. Installation for the cultivation of plants growing in root containers, comprising at least one tray having a base and raised walls all round, at least one cultivation conveyor belt which at least partly extends over the base of the tray, guide means, which are spaced sufficiently far apart for the root containers to fit between them, being fitted on either side along the conveyor belt, drive means enabling the conveyor belt to transport to a dispensing point, and means for tensioning the conveyor belt during transportation of the root containers and for relaxing the tension of the conveyor belt during cultivation of the plants when the conveyor belt is stationary, further comprising feed means for water so that the water may be allowed to flow into the tray from time to time, and wherein the tray is a gutter and wherein the guide means comprise the longitudinal side walls of the gutter, there being a multiplicity of said gutters arranged parallel to one another, each provided with one cultivation conveyor belt, one end of all gutters abutting a common main conveyor belt serving as a dispensing point.

2. Installation according to claim 1, further comprising a control unit which is movable on a rail along the main conveyor belt and can be coupled to each respective cultivation conveyor belt in order to drive the latter.

3. Installation according to claim 2, wherein the control unit comprises tensioning means for placing the relevant cultivation conveyor belt under tension.

4. Installation for the cultivation of plants growing in root containers, comprising at least one tray having a base and raised walls all round, at least one cultivation conveyor belt which at least partly extends over the base of the tray, guide means, which are spaced sufficiently far apart for the root containers to fit between them, being fitted on either side along the conveyor belt, drive means enabling the conveyor belt to transport to a dispensing point, and means for tensioning the conveyor belt during transportation of the root containers and for relaxing the tension of the conveyor belt during cultivation of the plants when the conveyor belt is stationary, wherein the cultivation conveyor belt is a continuous conveyor belt, the return section of which has an essentially vertical orientation.

5. Installation for the cultivation of plants growing in root containers, comprising at least one tray having a base and raised walls all round, at least one cultivation conveyor belt which at least partly extends over the base of the tray, guide means, which are spaced sufficiently far apart for the root containers to fit between them, being fitted on either side along the conveyor belt, drive means enabling the conveyor belt to transport to a dispensing point, and means for tensioning the conveyor belt during transportation of the root containers and for relaxing the tension of the conveyor belt during cultivation of the plants when the conveyor belt is stationary, wherein said means for tensioning the conveyor belt during transportation of the root containers and for relaxing the tension of the conveyor belt during cultivation of the plants when the conveyor belt is stationary comprise means mounting the drive means for movement toward and away from the belt.

6. Installation according to claim 5, said drive means comprising a motor that drives a drive wheel that contacts the belt and that presses the belt against a pressure roller when the drive means tensions the belt.

* * * * *